US008291227B2

(12) United States Patent
Parkinson

(10) Patent No.: US 8,291,227 B2
(45) Date of Patent: Oct. 16, 2012

(54) METHOD AND APPARATUS FOR SECURE COMMUNICATION

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 963 days.

(21) Appl. No.: 11/670,664

(22) Filed: Feb. 2, 2007

(65) Prior Publication Data

US 2010/0275025 A1 Oct. 28, 2010

(51) Int. Cl.
*H04L 29/06* (2006.01)
(52) U.S. Cl. ........................................ 713/176; 380/277
(58) Field of Classification Search .................. 713/176; 380/277, 278, 279
See application file for complete search history.

(56) References Cited

U.S. PATENT DOCUMENTS

| 5,757,913 | A  | * | 5/1998  | Bellare et al. ................. 713/168 |
|-----------|----|---|---------|----------------------------------------|
| 6,195,682 | B1 | * | 2/2001  | Ho et al. ........................ 709/203 |
| 7,571,464 | B2 | * | 8/2009  | Watkins ............................. 726/3 |
| 7,594,107 | B1 | * | 9/2009  | Parkhill ........................... 713/156 |
| 7,711,122 | B2 | * | 5/2010  | Allen et al. ..................... 380/286 |
| 7,840,993 | B2 | * | 11/2010 | Ganesan et al. .................. 726/7 |
| 2002/0002674 | A1 | * | 1/2002 | Grimes et al. ................. 713/156 |
| 2002/0038384 | A1 | * | 3/2002 | Khan et al. ..................... 709/245 |
| 2002/0126850 | A1 | * | 9/2002 | Allen et al. ..................... 380/277 |
| 2003/0126431 | A1 | * | 7/2003 | Beattie et al. .................. 713/156 |
| 2004/0008846 | A1 | * | 1/2004 | Medvinsky ..................... 380/278 |
| 2005/0050366 | A1 | * | 3/2005 | Kwok et al. ................... 713/202 |
| 2005/0149724 | A1 | * | 7/2005 | Graff ............................. 713/156 |
| 2005/0166262 | A1 | * | 7/2005 | Beattie et al. ..................... 726/5 |
| 2005/0216736 | A1 | * | 9/2005 | Smith ............................ 713/168 |
| 2005/0283614 | A1 | * | 12/2005 | Hardt ............................ 713/182 |
| 2006/0198517 | A1 | * | 9/2006 | Cameron et al. ................ 380/44 |
| 2006/0229909 | A1 | * | 10/2006 | Kaila et al. ........................ 705/2 |
| 2007/0038812 | A1 | * | 2/2007 | Miller et al. ................... 711/133 |
| 2007/0058814 | A1 | * | 3/2007 | Robinson ....................... 380/280 |
| 2007/0203848 | A1 | * | 8/2007 | Cameron et al. ................ 705/64 |
| 2007/0220594 | A1 | * | 9/2007 | Tulsyan ............................. 726/5 |
| 2008/0126806 | A1 | * | 5/2008 | Morten ........................... 713/176 |
| 2008/0240447 | A1 | * | 10/2008 | Zhu et al. ....................... 380/279 |
| 2008/0288790 | A1 | * | 11/2008 | Wilson ........................... 713/194 |
| 2009/0327296 | A1 | * | 12/2009 | Francis et al. ..................... 707/9 |

OTHER PUBLICATIONS

R. Housley RSA Laboratories W. Polk Nist W. Ford VeriSign D. Solo Citigroup Apr. 2002 Internet X.509 Public Key Infrastructure Certificate and Certificate Revocation List (CRL) Profile Network Working Group, Request for Comments: 3280, Obsoletes: 2459, Category: Standards Track.*

* cited by examiner

*Primary Examiner* — Kim Vu
*Assistant Examiner* — Sayed Beheshti Shirazi
(74) *Attorney, Agent, or Firm* — Lowenstein Sandler PC

(57) ABSTRACT

In a device, method and/or computer-readable medium for secure communication between a client device and a server, the client device includes a browser for accessing a website provided by the server, the client device generates a key according to a key generating cryptographic routine; tags the key with a marker associating the key with the website; and stores the tagged key in a memory associated with the browser.

23 Claims, 8 Drawing Sheets

METHOD AND APPARATUS FOR SECURE COMMUNICATION

DESCRIPTION OF THE INVENTION

1. Field of the Invention

The present invention relates generally to secure communication between a client device and a server, and, more particularly, to secure communication based upon cryptographic keys.

2. Background of the Invention

Generally, a client device such as a personal computer can use a hypertext transfer protocol (HTTP) user agent such as a web browser to access information provided by way of access to an addressed location such as, for example, a website on the so-called World Wide Web. The website can be provided by a web server in private networks, file systems, or in the Internet. The web browser is a software application for accessing and displaying the website on the client device. Exemplary web browsers include the Netscape Navigator web browser, Internet Explorer web browser and Mozilla web browser. Web browsers can include a scripting engine for interpreting script obtained during website access. Exemplary scripting engines include JavaScript, which is used in Netscape and Mozilla web browsers, and Jscript, which is used in the Internet Explorer web browser.

Cryptographic protocols such as, for example, Secure Sockets Layer (SSL) or Transport Layer Security (TLS), can provide a public key based infrastructure for secure communications between the client device and a web server over the Internet for such data transfers as web browsing, e-mail, Internet faxing, or the like. Generally, the client device will access a particular website provided by a web server via the web browser of the client device. The web browser can establish a transmission control protocol (TCP) connection on the HTTPS TCP port 443 with the web server. The web browser and web server then negotiate the particular SSL or TLS version that will be used for the SSL session. The web server can send a certificate verifying the web server and including a key for encryption to the web browser via the website. The client can use the key for encrypting information to be sent to the web server.

It would be advantageous to add web browser support to use various cryptographic routines that can be used in conjunction with the active script at the website. However, running arbitrary server-provided code on the client device can be a security issue. For example, JavaScript has been frequently used to steal confidential information by techniques such as cross-site scripting (XSS). Particularly, malicious websites can include active scripts to gain access to the confidential information at the client device. Currently, the mechanisms included in web browsers for protecting against access from such malicious websites are immature. Therefore, web browser vendors have not exposed access to cryptographic routines such as key generation via website active script.

Therefore, it would be advantageous to provide web browser support for cryptographic routines while safely guarding cryptographic data as well as other confidential information.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures:

FIG. 2I is a diagram illustrating data access for key based cryptographic data in accordance with embodiments of the present invention;

DETAILED DESCRIPTION

Figure 1:
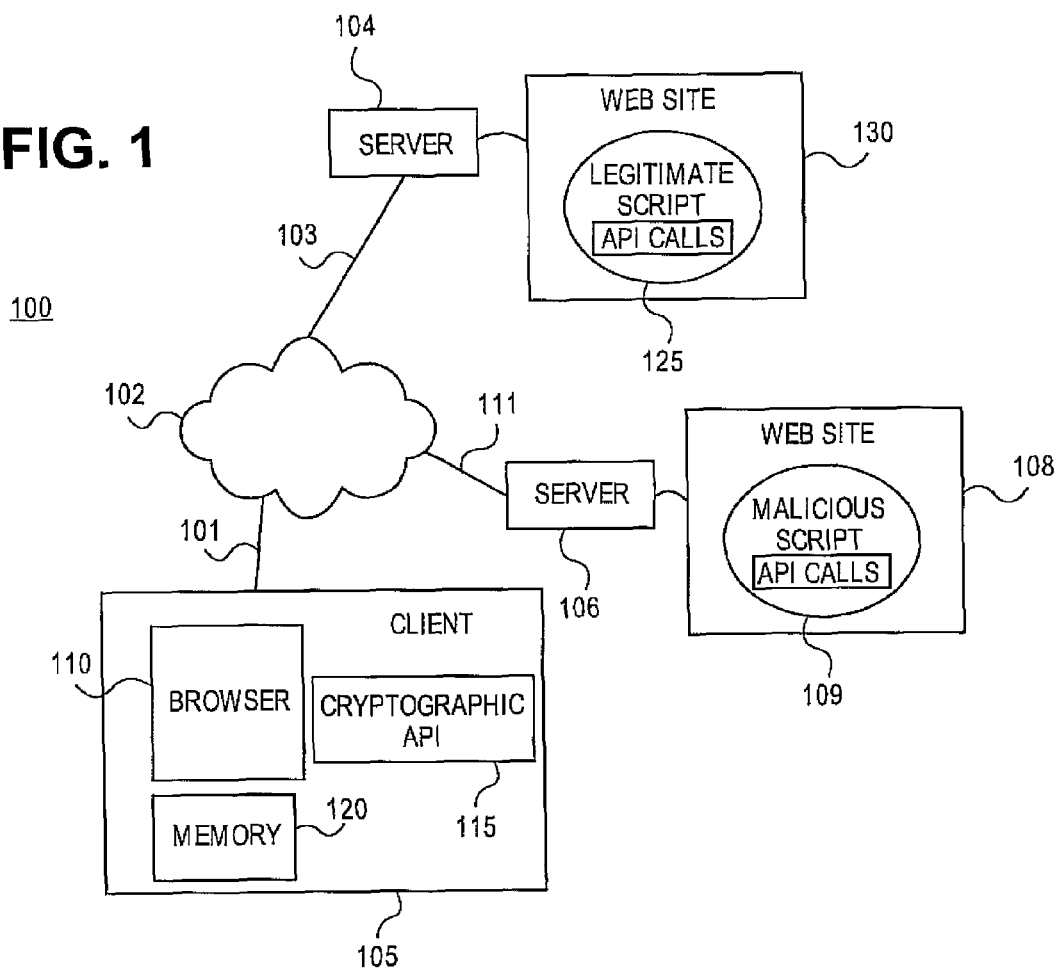
FIG. 1 is a diagram illustrating a simplified and representative environment in which a method and device for secure communication can be implemented according to embodiments of the present invention.

In accordance with the invention, one or more embodiments relate generally to a method of secure communication between a client device and a server. The client device includes a browser for accessing a website provided by the server. The method includes: generating a key according to a key generating cryptographic routine; tagging the key with a marker associating the key with the website; and storing the tagged key in a memory associated with the browser. If the browser has previously obtained a digital certificate such as, for example, a Secure Sockets Layer (SSL) certificate for the website, then the key can be tagged with information from the certificate as the marker. For example, the information can include identification data of one or more trusted entities listed on the certificate that are verified by the certificate authority that issued the certificate. Thereby, data generated based upon the tagged key can only be exported to the one or more trusted entities.

The method further includes: generating cryptographic data based upon the tagged key; associating the cryptographic data with the tagged key; and storing the cryptographic data in the memory. The cryptographic data can be transferred to another server providing another website if the marker of the tagged key is associated with the particular website. The cryptographic data can be generated from a cryptographic routine such as: digital signature generation, data encryption, data decryption and digital signature verification.

The browser can include a scripting engine for interpreting script provided during access to the website. Exemplary scripting engines include but are not limited to JavaScript and Jscript. A key can be generated while interpreting the script provided during access to the website and the key can be tagged with the marker associating the key with the website. The tagged key can then be stored in a memory associated with the browser.

The key can be tagged with key export privileges defining conditions for permitting export of data generated based upon the key. Cryptographic data generated based upon the tagged key is tagged with the marker and the cryptographic data can be exported to a server providing a website if the marker of the cryptographic data is associated with origin data of the website or if the marker of the tagged key from which the cryptographic data was generated is associated with the website. A determination of whether to export the cryptographic data to a server providing a website can further be based upon if the key export privileges of the tagged key from which the cryptographic data was generated permit export of the data and if the marker of the tagged key is associated with the another website.

Other embodiments also provide a processor included in the client device that is configured to: generate a key while interpreting the script at the website; tag the key with a marker defining export privileges of the tagged key; and store the tagged key in a memory associated with the browser. The processor can further be configured to: generate cryptographic data based upon the tagged key and export the cryptographic data to the server if the marker of the tagged key permits exporting the data to the website provided by the server.

The marker for tagging the key can include identification data of the website of the interpreted script so that the website can be defined as an entity to which key-based data can be exported and/or so that the server providing the website can be defined as an entity to which data generated based upon the tagged key can be export. The marker for tagging the key can include information from a certificate associated with the website of the interpreted script. The information from the certificate includes, for example, names of trusted entities so that data generated based upon the tagged key can be exported to the trusted entities. The marker for tagging the key can also include a domain so that websites associated with the domain are defined as entities to which data generated based upon the tagged key can be export.

The processor can be further configured to perform one of data encryption, data decryption, digital signature generation and digital signature verification to generate the cryptographic data based upon the tagged key.

In overview, the present disclosure concerns secure communication between a client device and a server in which the client device interprets scripts from an information source such as a website provided by the server. Here, websites will refer generally to data files provided by servers for access on private or public networks, Web sites provided by servers for access on the so-called World Wide Web, or the like.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As further discussed herein below, various inventive principles and combinations thereof are advantageously employed to provide secure communication between a client device and a server.

Reference will now be made in detail to the accompanying drawings. Wherever possible, the same reference numbers will be used throughout the drawings to refer to the same or like parts.

Referring now to FIG. 1, a simplified and representative network environment 100 in which a method and device for secure communication can be implemented according to embodiments will be discussed and described. The basic representative environment includes a client device 105 connected to servers 104, 106 via a network 102. The network 102 can be the Internet, a Local Area Network, private network, or the like. The servers 104, 106 can be connected to the network 102 through connections 103 and 111 respectively. The client device 105 can be connected to the network 102 through a connection 101, which can be any one of a number of different types of wired or wireless connections as would be appreciated in the art.

The client device 105 can be configured with a software application referred to as a web browser or simply a browser, represented by browser 110, for managing requests for access to and displaying content of various domains or websites using the hardware resources of the client device 105. The browser 110 may be, for example, Netscape Navigator web browser, Internet Explorer web browser, Mozilla web browser, Firefox web browser, or the like. It will be appreciated that the browser 110 can be connected to the network 102 by way of the connection 101 and any software modules or software drivers executing on the processor hardware of client device 105, which modules or drivers are necessary to conduct the low level communication functions, which ideally are transparent to the browser 110. The browser 110 can include a script interpreter such as, for example, JavaScript, Jscript, or the like for interpreting script provided during the access to the websites.

The client device 105 can also include one or more cryptographic application program interfaces (APIs) represented by cryptographic API 115 for performing cryptographic related routines such as key generation, data encryption and decryption, digital signature generation and digital signature verification. The key generation routine can be, for example, a symmetric key routine for generating a private key, such as, for example, Advanced Encryption Standard (AES), Data Encryption Standard (DES), Twofish, Serpent, Blowfish, CASTS, RC4, IDEA, or the like, or an asymmetric key or public key routine for generating a private and public key pair such as, for example, Rivest, Shamir and Adleman (RSA), elliptic curve cryptography, or the like. The routine for data encryption and decryption, digital signature generation and digital signature verification will correspond with the key generation routine used.

The client device 105 can also include a memory source represented as memory 120 associated with the browser 110. The memory 120 may be, for example, an external element connected to the client device 105 such as a smart card or an internal memory element such as a persistent storage of the browser 110. Key/keys, cryptographic data generated by the cryptographic API 115 as well as other confidential data can be stored in the memory 120 to be safely guarded from malicious entities.

Generally, the browser 110 at the client device 105 can be used to access websites provided by web servers, such as a website 130 provided by server 104. During access, the browser can obtain and interpret markup language such as Hypertext Markup Language (HTML) code and script 125 from the website 130. The script 125 can include API calls to the cryptographic API 115 at the client device 105 to thereby cause the client device 105 to perform one of the cryptographic routines discussed above. However, a problem can occur when the browser 110 accesses malicious websites such as website 108 provided by server 106. Particularly, the website 108 includes malicious script 109 that also includes API calls to the cryptographic API 115 at the client device 105. When the browser 110 access the website 108, the script interpreter will automatically interpret the malicious script 109 as well as the API calls. The malicious script 109 could include script for gaining access to a key, encrypted data or other confidential data that was previously stored in the memory 120. Mechanisms are therefore needed to safeguard the confidential data in the memory 120 while still permitting execution of script provided by websites.

Figure 2A:
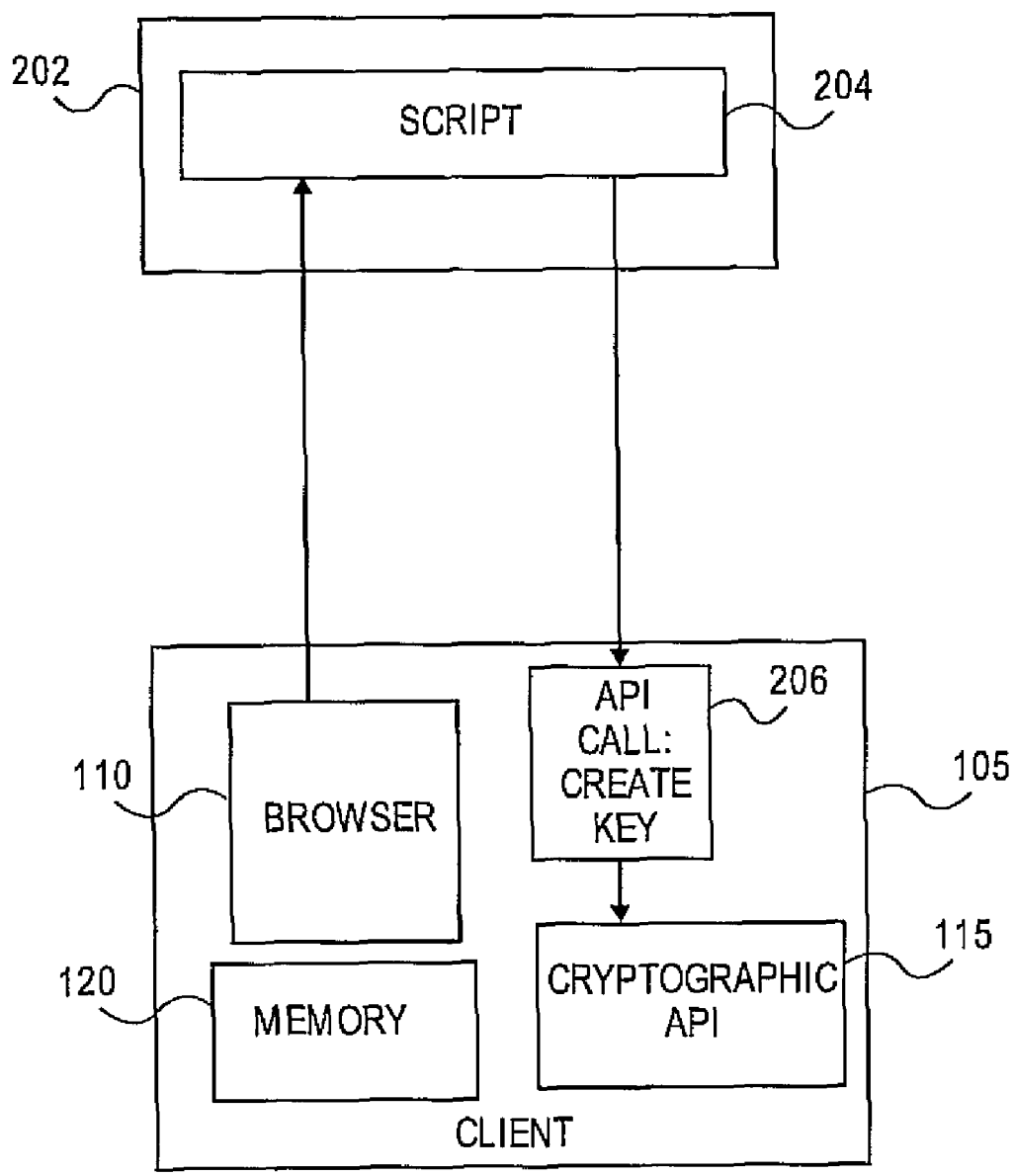
FIGS. 2A-2C are diagrams illustrating key generation and key storage in accordance with embodiments of the present invention.
Figure 2B:
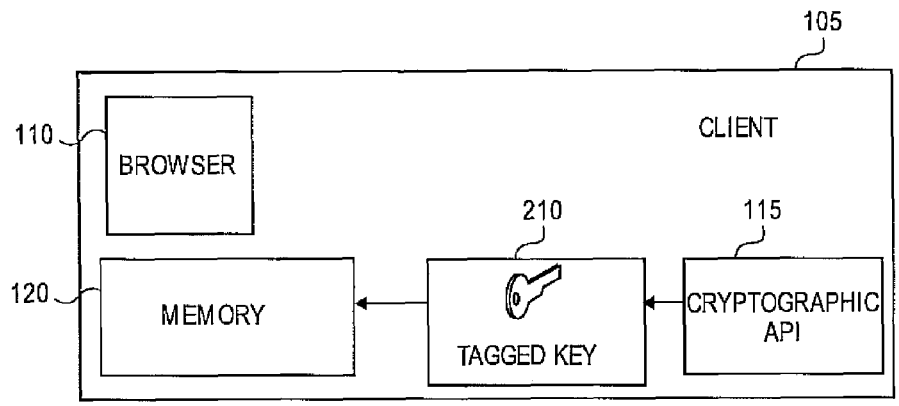
Figure 2C:
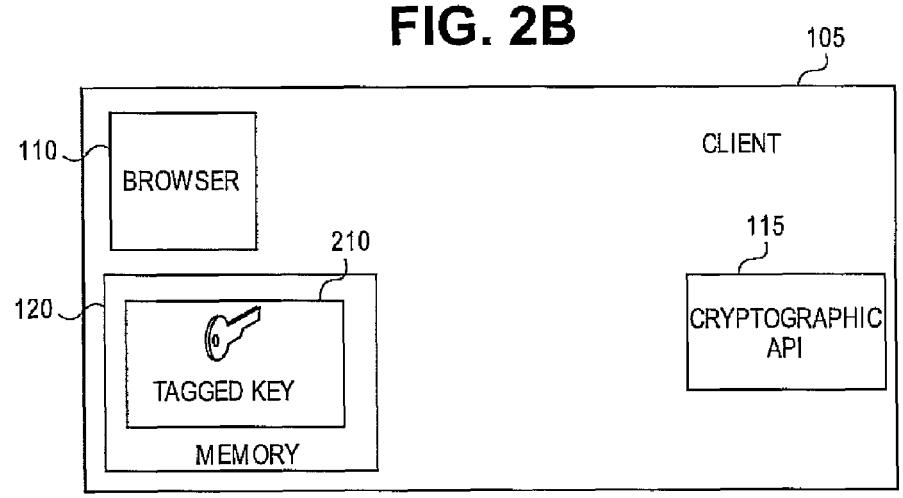

Referring to FIGS. 2A-2C, a method of key generation and key storage including a mechanism for safeguarding the confidential data in the memory 120 will be discussed. In FIG. 2A, the browser 110 of the client device 105 is executing code 202 from a website. For ease of illustration, the code 202 is shown separate from the client device 105. However, the code 202 could be downloaded locally onto the client device 105 and then executed locally or executed in real time, or possibly executed remotely at the server providing the website. The code 202 includes script 204 that is interpreted by the script interpreter included in the browser 110. The script 204 includes an API call to the cryptographic API 115 to generate cryptographic data such as a cryptographic key. The API call is represented as API CALL: CREATE KEY 206. The API call 206 is received and processed by the cryptographic API 115.

Figure 2D:
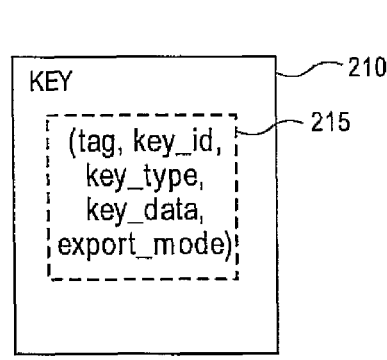
FIGS. 2D-2E are diagrams illustrating an exemplary format for a marker of a tagged key and an exemplary marker in accordance with embodiments of the present invention.

As shown in FIG. 2B, the cryptographic API 115 generates a key according to a key generating cryptographic routine and tags the key with a marker associating the key with the website. As shown in FIG. 2C, the tagged key 210 is stored in the memory 120 associated with the browser 110. An exemplary format for the marker 215 of the tagged key is shown in FIG. 2D. The marker 215 can include variables such as a tag variable, key_id variable, key_type variable, key_data variable, and export_mode variable. The tag variable can be, for example, the website of origin from which the script 204 was obtained such as, for example, an HTTP address. The key_id variable can be the particular type of key such as, for example, private key for encryption, public key for decryption, or the like. The key_type variable can include the type of key. The key_data variable can include the binary data of the actual key. The export_mode variable can specify export privileges defining conditions for permitting export of data generated based upon the key. In a simple exemplary case, the export_mode variable can be a Boolean value or a flag in which TRUE or flag on would represent export permitted and FALSE or flag off would represent export prohibited.

Figure 2E:
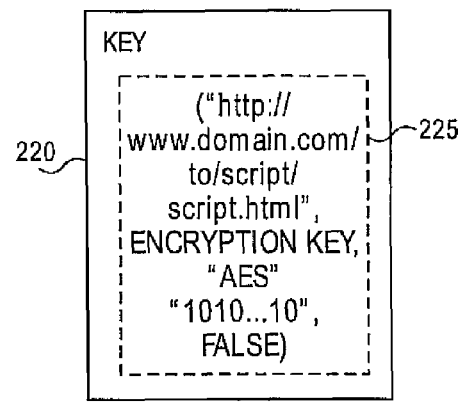

An exemplary key 220 including an exemplary marker 225 is shown in FIG. 2E. The marker 225 includes the HTTP address "http://www.domain.com/to/script.html" as the tag variable, encryptionkey as the key_id variable, AES as the key_type variable, 1010 . . . 10 as the key_data variable, and FALSE as the export_mode variable. An export_mode of FALSE will prohibit export of data generated based upon the tagged key. For example, if the tagged key is a private key in an asymmetric routine or decrypted data generated based upon the tagged key, such data can include export_mode of FALSE so that the data is never exported from the client device 105.

Alternatively, if the browser 110 has previously obtained a certificate associated with the website from which the script originated issued by a certificate authority, information from the certificate such as identification data or names of one or more trusted entities can be included in the tag so that data generated based upon the tagged key can be exported to the one or more trusted entities.

The marker 215 of the key 210 is not limited to including the HTTP address of a website as the tag in the marker 215 as shown in exemplary marker 225. The marker 215 can also include general identification data of the website rather than the HTTP address to define the website or the server of the website as an entity to which the tagged key and/or data generated based upon the tagged key can be exported. Further, the marker 215 can only include a domain or top level domain as the tag to define websites associated with the domain as entities to which data generated based upon the tagged key can be export. The domain could also include wild card characters such as "*" or "$" to include particular websites associated with the domain as entities to which data generated based upon the tagged key can be export.

Figure 2F:
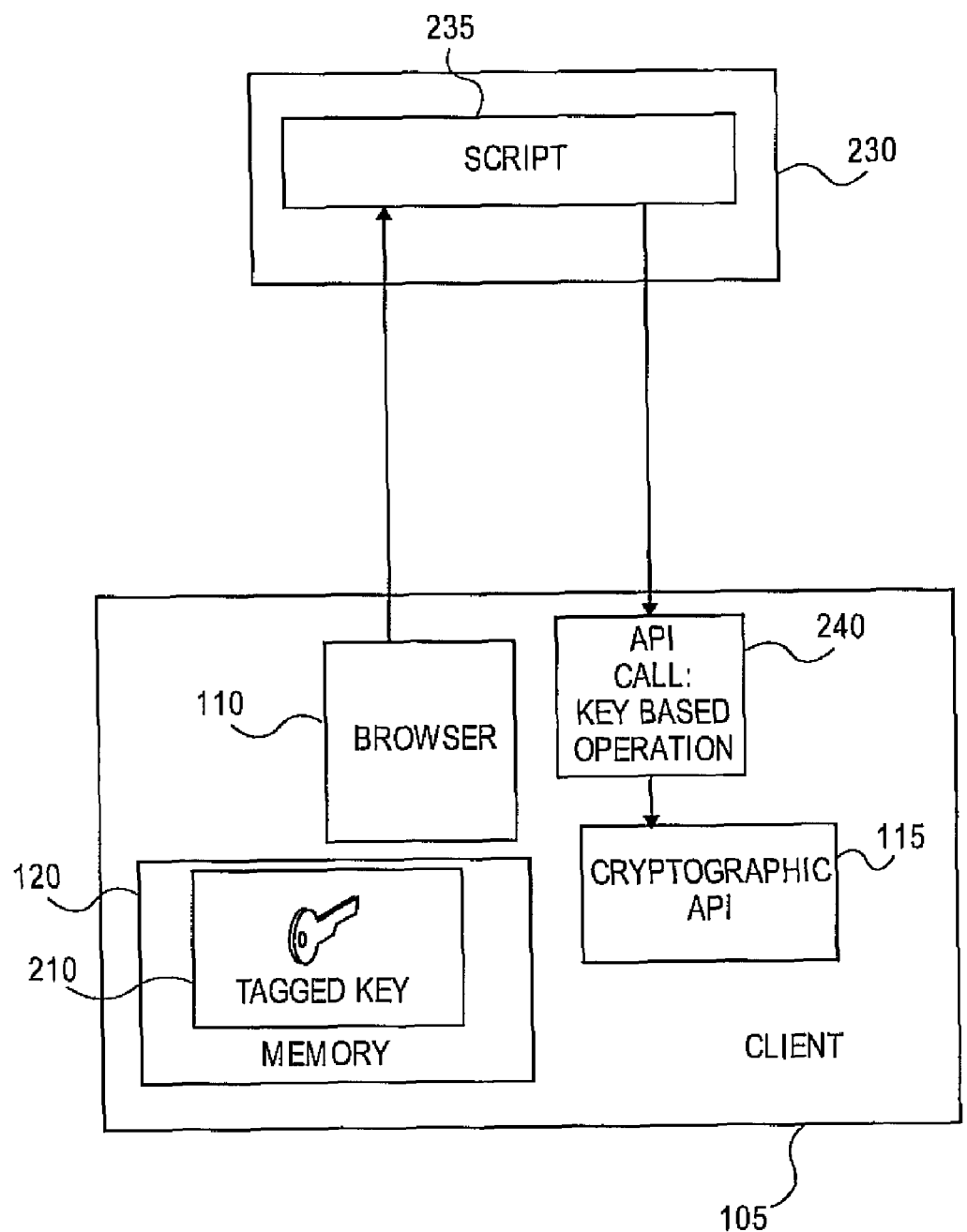
FIGS. 2F-2H are diagrams illustrating cryptographic data generation based upon the tagged key and storage of the cryptographic data in accordance with embodiments of the present invention.

Referring to FIGS. 2F-2I, a method of generating cryptographic data based upon the tagged key 210 and storing it in the memory 120 will be discussed. In FIG. 2F, the browser 110 of the client device 105 is executing code 230 from a website. The website could be different from the website providing the code 202 of FIG. 2A or it could be the same website. The code 230 could be downloaded locally onto the client device 105 and executed locally or executed in real time at the server providing the website. The code 230 includes script 235 that is interpreted by the script interpreter included in the browser 110. The script 235 includes an API call to the cryptographic API 115 to generate cryptographic data based upon the tagged key. The API call is represented as API CALL: KEY BASED OPERATION 240 in FIG. 2F. The API call 240 is received and processed by the cryptographic API 115. The API call may be to perform a cryptographic routine such as, for example, data encryption, data decryption, digital signature generation or digital signature verification.

Figure 2G:
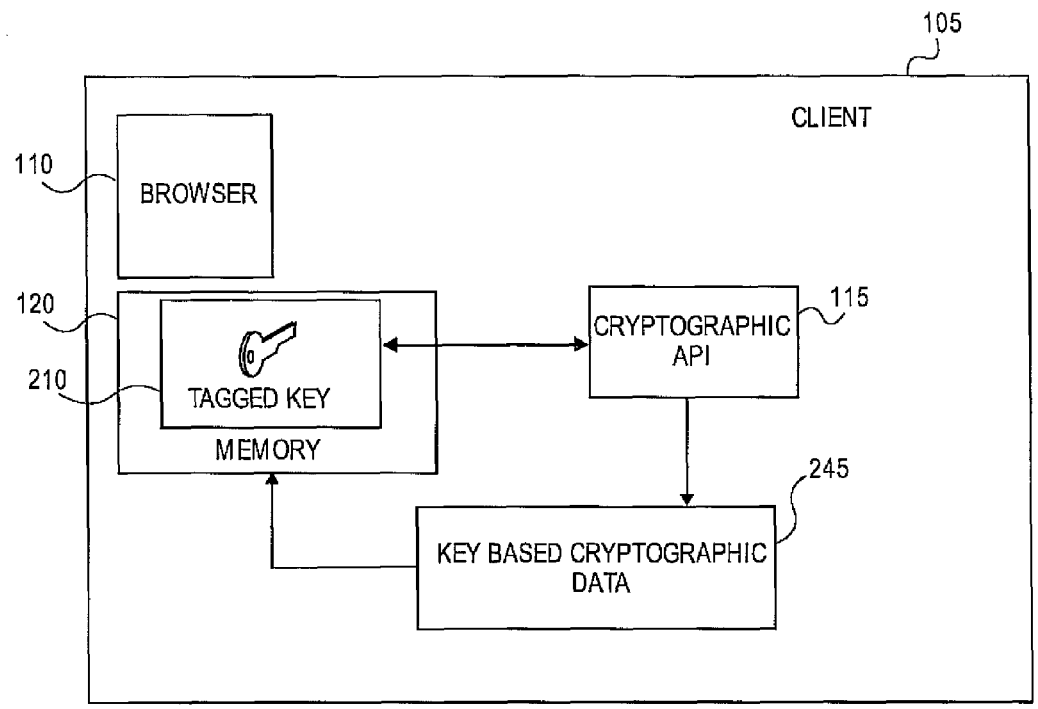
Figure 2H:
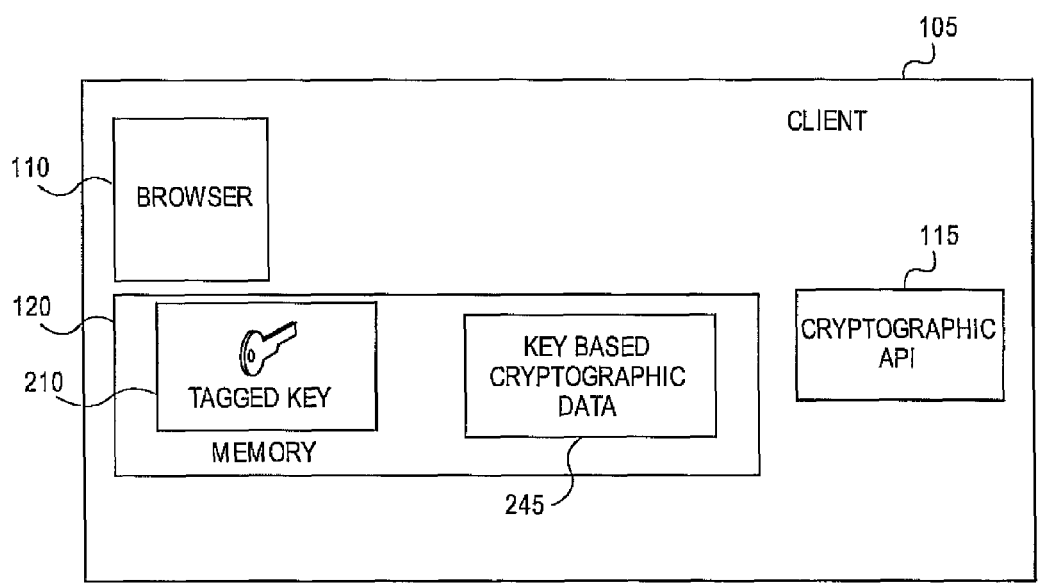
Figure 21:
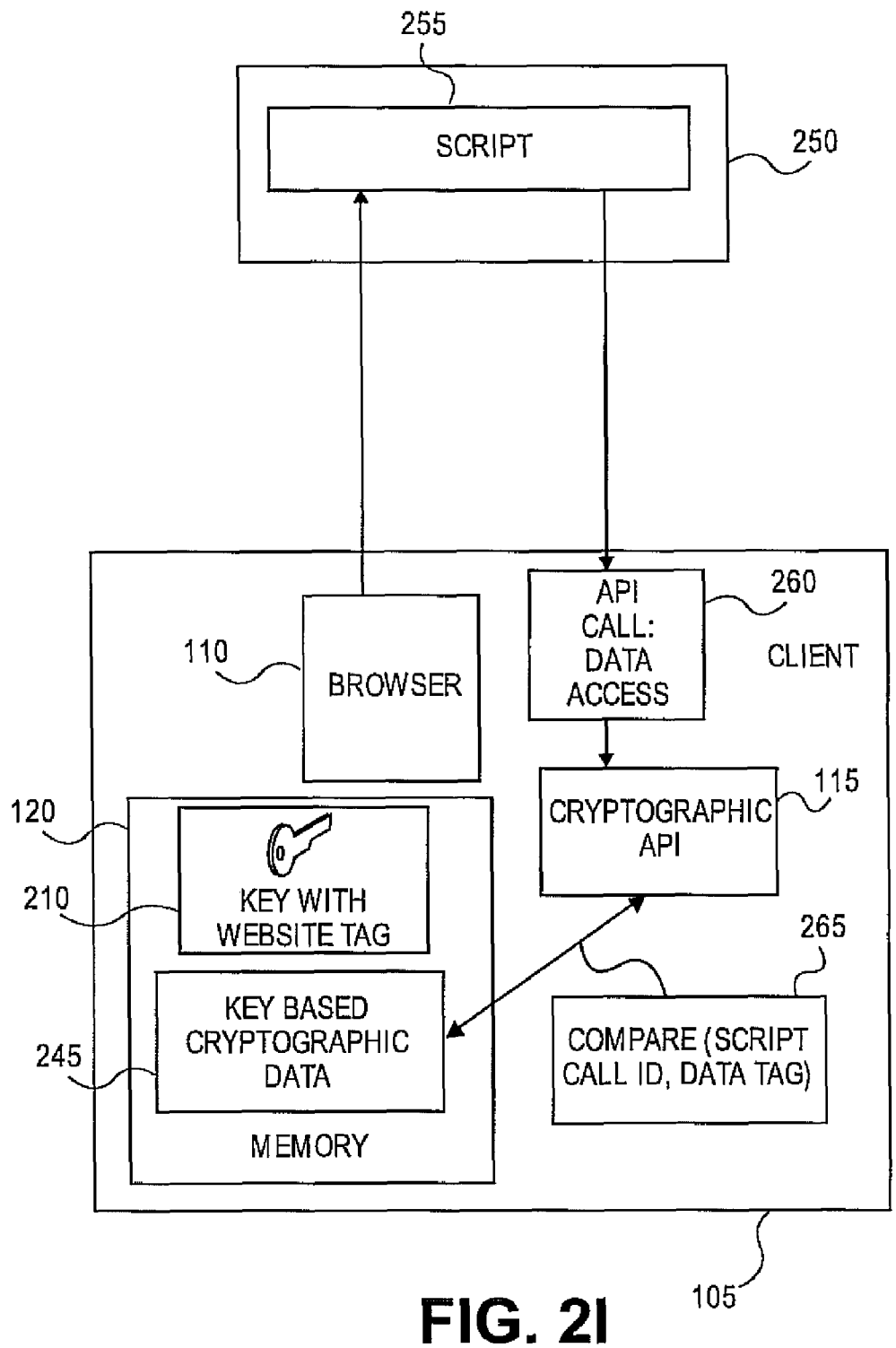

As shown in FIG. 2G, the cryptographic API 115 obtains the tagged key 210 from the memory 120, and performs the cryptographic operation requested in the API call to generate the cryptographic data based upon the tagged key 210. Alternatively, here the cryptographic API 115 can compare the origin such as the website address of the API CALL 240 with the marker of the tagged key 210, and only generate the cryptographic data if the marker is associated with the origin of the API CALL 240. The cryptographic data is represented as key based cryptographic data 245. The key based cryptographic data 245 can be associated with the tagged key 210 by tagging the cryptographic data 245 also with the marker used for tagging the key. It should be noted that the cryptographic operation is preferably performed locally at the client device 105. As shown in FIG. 2H, the key based cryptographic data 245 is stored in the memory 120.

As shown in FIG. 2I, the browser 110 of the client device 105 is executing code 250 from a website. The website could be different from the website providing the code 202 of FIG. 2A or the website providing the code 230 of FIG. 2F, or it could be the same as one or both of those websites. The code 250 can be downloaded locally onto the client device 105 and then executed locally or executed in real time. The code 250 includes script 255 that is interpreted by the script interpreter included in the browser 110. The script 255 includes an API call to the cryptographic API 115 to obtain access to the cryptographic data generated based upon the tagged key or the tagged key stored in the memory 120. The API call is represented as API CALL:DATA ACCESS 260. The API call 260 is received and processed by the cryptographic API 115.

The cryptographic API 115 compares the marker of the cryptographic data 245 or the marker of the tagged key 210 with the origin of the script 255 from which the API call arrived. This operation is represented as COMPARE (SCRIPT CALL ID, DATA TAG) 265. For example, the origin data of the script 255 such as, for example, the HTTP address of the website, can be compared with identification data of the tagged key from which the cryptographic data 245 was generated. The cryptographic data 245 is transferred to the server providing the website if the marker of the cryptographic data 245 is associated with the identification data of the website. If the tagged key 210 has also been tagged with key export privileges such as the export_mode variable, then the cryptographic data 245 generated based upon the tagged key will not be transferred or exported to the server of the website unless the export_mode variable of the marker is equal to TRUE.

For example, if the key 210 was generated based upon the API call in the legitimate script 125 of the website 130, then the key will be tagged with a marker associating the key 210 with the website 130 and stored in the memory 120. If the browser 110 subsequently accesses the website 108 and is provided with the malicious script 109 including an API call requesting the tagged key 210, then the tagged key 210 will not be exported to the server 106 providing the website 108 because the origin data such as the HTTP address of the website of the API call is not associated with the marker of the tagged key 210.

Further, if cryptographic data, such as, for example, decrypted data, is generated based upon the key 210, then the decrypted data can be associated with the key 210 to thereby also tag the key 120 data with the marker associating the key 210 with the website 130. Alternatively, the decrypted data itself can be tagged with a marker associating the decrypted data with the website 130. If the browser 110 subsequently accesses the website 108 and is provided with the malicious script 109 including an API call requesting the decrypted data, the decrypted data will not be exported to the server 106 providing the website 108 because the origin data such as the HTTP address of the website of the API call is not associated with the marker of the decrypted data or the marker of the tagged key 210. Further, if the browser 110 subsequently accesses a website different then the website 130 or the website 108, that is, another website, then the decrypted data can be exported to the website if the origin data such as the HTTP address of the another website is associated with the marker of the decrypted data or the marker of the tagged key 210.

Figure 3C:
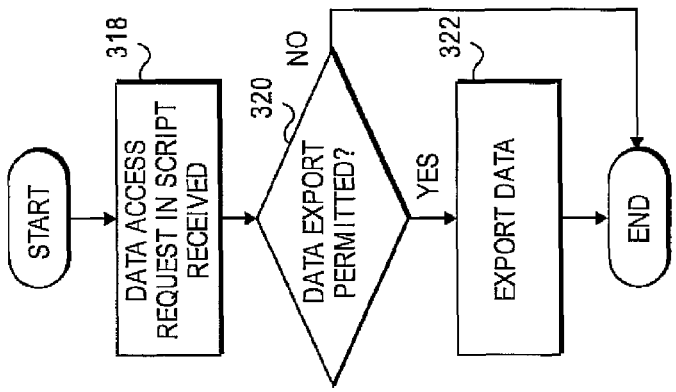
FIGS. 3A-3C are flow charts illustrating exemplary operations of the client device in accordance with embodiments of the present invention.
Figure 3B:
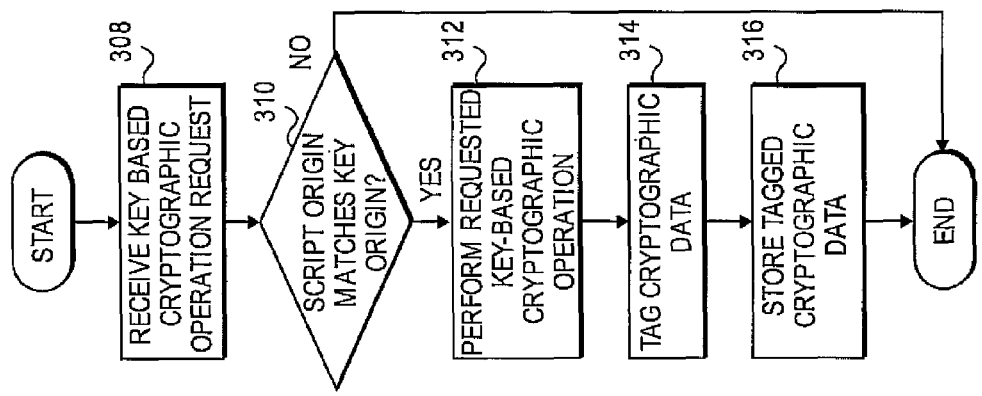
Figure 3A:
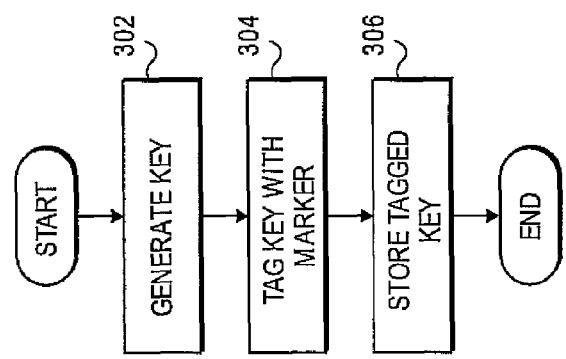

Referring to FIG. 3A, an exemplary procedure for generating a key that can be safely guarded from malicious script such as that of the website 108 will be discussed. At 302, the client device 105 generates a key according to a cryptographic routine such as a symmetric or asymmetric key routine. The key can be generated in response to an API call included in script provided by a website and interpreted by the browser 110. At 304, the key is tagged with a marker associating the key with the website from which the script originated. For example, as shown in FIGS. 2D-2E, the marker 215 can include a tag such as the HTTP address of the website. Here, the key can also be tagged with key export privileges defining conditions for permitting export of data generated based upon the key. If the client device 105 has a certificate associated with the website, then the key can be tagged with information from the certificate.

At 306, the tagged key is stored in the memory 120 associated with the browser 110. The memory 120 can be, for example, a persistent storage at the client device 105 or an external memory element such as a smart card. Tagging the key with the marker 215 can prevent export or transmission of the key to entities such as servers providing websites not associated with the marker as discussed more fully below.

Referring to FIG. 3B, an exemplary procedure for generating cryptographic data based upon the tagged key in which the cryptographic data can be safely guarded from malicious script such as that of the website 108 will be discussed. At 308, the client device 105 receives a key based cryptographic operation request to generate cryptographic data based upon the tagged key. The key based cryptographic operation request can be an API call included in script provided by a website and interpreted by the browser 110. The website can be the same or different from the script of the website that included the API call to create the key.

At 310, the client device 105 can determine if the origin of the script including the key based cryptographic operation request is associated with the marker of the tagged key. That is, the client device 105 can determines if the marker of the tagged key is associated with origin data such as the HTTP address of the website providing the script including the key based cryptographic operation request. The procedure can end here if the client device 105 determines that the marker of the tagged key is not associated with the tagged key.

If, at 310, the client device 105 determines that the script origin is associated with the marker of the tagged key, then at 312 the client device 105 can perform the requested key-based cryptographic operation. Particularly, the client device 105 can perform, for example, digital signature generation, data encryption, data decryption and digital signature verification based upon the tagged key to generate cryptographic data.

At 314, the client device 105 tags the cryptographic data with the marker of the tagged key to associate the cryptographic data with the tagged key. At 316, the client device 105 stores the tagged cryptographic data in the memory. Tagging the cryptographic data with the marker can prevent export or transmission of the cryptographic data to entities such as websites not included in the marker as discussed more fully below.

Referring to FIG. 3C, an exemplary procedure for transmitting the cryptographic data and/or the tagged key to another entity will be discussed. At 318, the client device 105 receives a data access request in script of a website. The data access request can be an API call included in script provided by a website and interpreted by the browser 110. That is, while the browser 110 is interpreting script of the website, it interprets a command to access cryptographic data or the tagged key stored in the memory.

At 320, the client device 105 determines if the cryptographic data and/or the key can be exported to the script origin. Here, the client device 105 determines if the origin of the script including the data access request matches the origin of the script for which the key generated. That is, the client device 105 determines if the marker of the cryptographic data is associated with origin data such as a website of the script including the data access request. The cryptographic data can be transmitted to the server providing the website at 322 if the marker of the tagged key from which the cryptographic data was generated is associated with the website.

If the marker of the key includes key export privileges, then the tagged key and/or the cryptographic data will not be exported to the server providing the website or to the website itself at 322 unless the export privileges permit exporting of the cryptographic data.

It should be noted that the client device 105 can alternatively export the cryptographic data directly to the origin of the script at 312 without storing the cryptographic data in the memory at 316. Also, the comparison between the marker of the key and the script origin can be perfouned before generating the cryptographic data. Particularly, the script origin of the API call could be compared with the marker of the tagged key. The cryptographic data would only be generated if the script origin of the API call was associated with the marker of the tagged key.

Further, rather than separate cryptographic operation and data access requests as illustrated at 308 and 318, the script could include one request to a cryptographic operation based upon the tagged key and access of the resultant data. In such a case, the client device 105 can generate the cryptographic data and then compare the marker of the key with the script origin request, and export the data if the script origin is associated with the key. Alternatively, the client device 105 can compare the script origin with the marker of the tagged key before generating the cryptographic data.

An example will be discussed with reference to the procedures of FIGS. 3A-3C in which a client device generates a key with a marker similar to the marker 225 shown in FIG. 2E. A client device 105 accesses a website with an HTTP address of "http://www.domain.com/path/to/script/script.html." The website provides script to the client device 105, which is interpreted by the browser 110. The script includes an API call to generate an AES key. At 302, the client device 105, particularly the cryptographic API 115, generates the AES key. At 304, the browser 110 tags the key with the marker. The marker can include variables such as tag, key_id, key_type, key_data and export mode. In a default case, the browser 110 can assign the HTTP address of the website as the tag in the marker. Alternatively, the tag could include a wildcard character as discussed above to include a group of websites associated with a particular domain. The export mode variable included in the marker can be, for example, a flag having a plurality of modes to define the key export privileges of the AES key and data generated based upon the ABS key to define conditions for permitting export of data generated based upon the key. Exemplary modes can include FREELY_EXPORT, EXPORT_TO_ORIGIN, and DO_NOT_EXPORT. For example, if the mode is assigned FREELY_EXPORT, then data generated based upon the AES key can be sent to any entity. Such a mode may be assigned to, for example, encrypted data. If the mode is assigned EXPORT_TO_ORIGIN, then data generated based upon the AES key can only be sent to scripts matching the origin tag. If the mode is assigned DO_NOT_EXPORT, then data generated based upon the key can never be exported. Here, the key is assigned the mode DO_NOT_EXPORT. At 306, the browser 110 stores the key in a persistent memory.

At 308, the browser 110 interprets a portion of script which uses the tagged key. For example, the script may include ciphertext to be decrypted by the AES key. The browser 110 locates the origin of the website automatically from the script context. At 310, the origin of the website can be compared with one or more tagged keys stored in the persistent storage. If, at 310, no tagged key is found including a tag matching the origin of the website, then the procedure ends. If, at 310, a tagged key including a tag matching the origin of the website is located, then at 312 the client device 105 decrypts the ciphertext with the particular key. However, although the tagged key included a tag matching the origin of the website, the resultant data is not transmitted to the server of the website at 322 because the key included the tag DO_NOT_EXPORT.

Figure 4:
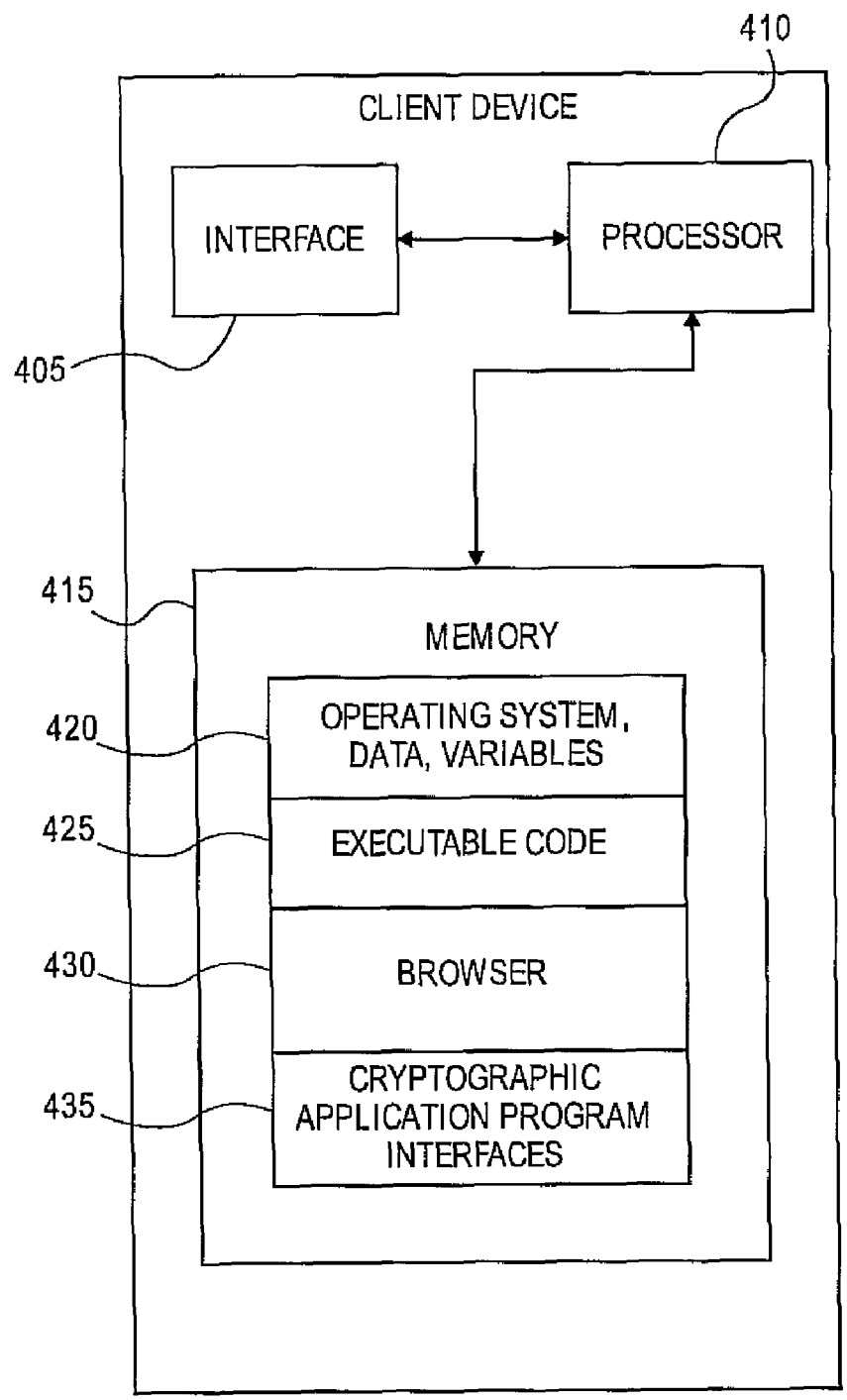
FIG. 4 is a block diagram illustrating portions of an exemplary client device in accordance with embodiments of the present invention.

Referring to FIG. 4, exemplary portions of the client device 105 will be discussed. The client device 105 includes an interface 405, a processor 410 and a memory 415 as well as optionally known peripherals for interfacing with a user, such as a display and input devices (not illustrated). The client device 105 can be, for example, a personal computer. The interface 405 can operate in connection with the processor 410 to facilitate a network connection and exchange and transfer of information associated with content of a website provided by a server. The interface 405 may also be utilized in connection with another computer by known USB technology. Further, the interface 405 may be used to provide a connection with an external memory element such as a smart card or CD-ROM. The processor 410 can be one of a variety of different processors including general purpose processors, custom processors, controllers, compact eight-bit processors or the like. The memory 415 can be coupled to the processor 410 and can be one or a combination of a variety of types of memory such as random access memory (RAM), read only memory (ROM), flash memory, dynamic RAM (DRAM), a programmable ROM (PROM), flash memory, and/or an EEPROM. The memory 415 may include multiple memory locations and store an operating system, data and variables 420 and executable code 425.

Further, the memory 415 can include instructions such as computer programs which can direct the processor 410 in controlling the operation of the client device 105. The computer programs can include, for example, a program 430 for providing the browser 110, which is shown as BROWSER, and a program 435 for providing the cryptographic application program interfaces 115, which is shown as CRYPTOGRAPHIC APPLICATION PROGRAM INTERFACES.

The programs for providing the cryptographic application program interfaces 435 can configure the processor 410 to generate a key according to a cryptographic routine. The key can be generated, for example, while the browser 110 interprets script provided by a website. The programs for the cryptographic application program configure the processor 410 to tag the key with a marker defining export privileges of the tagged key and to store the tagged key in a memory associated with the browser 110. The memory can be, for example, a persistent storage associated with the browser 110 or an external element such as a smart card. Accordingly, the memory 415 can include further programs or instructions for providing the persistent storage.

The marker for tagging the key can include identification data such as the HTTP address of the website of the interpreted script to thereby define the server providing the website as an entity to which data generated based upon the tagged key can be export. The marker can also include information from a certificate associated with the website of the interpreted script to thereby define the information from the certificate such as names of one or more trusted entities as entities to which data generated based upon the tagged key can be export. Also, the marker for tagging the key can includes a domain to thereby define websites associated with the domain as entities to which data generated based upon the tagged key can be export.

The program 435 further configures the processor to generate cryptographic data based upon the tagged key and permit transmission of the cryptographic data to a server providing a website if the marker of the tagged key permits export to the server. The cryptographic data can be generated by, for example, encrypting data with the tagged key, decrypting data with the tagged key, signing data with the tagged key to obtain a digital signature, and decrypting a digital signature with the tagged key to verify the digital signature.

Any of the above described methods and procedures can be embodied as instructions stored on a computer readable medium, which includes storage devices and signals, in compressed or uncompressed form. Exemplary computer readable storage devices include conventional computer system RAM, ROM, EPROM, EEPROM, and magnetic or optical disks or tapes. Exemplary computer readable signals, whether modulated using a carrier or not, are signals that a computer system can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should also be understood that although various logical groupings of blocks and elements were described above, different realizations may omit one or more of these logical groupings. Likewise, in various realizations, blocks may be grouped differently, combined, or augmented. Furthermore, one or more blocks including those identified herein as optional can be omitted from various realizations. For example, the present description may describe or suggest a collection of data and information. One or more embodiments can provide that the collection of data and information can be distributed, combined, or augmented, or provided locally and/or remotely.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method comprising:
   receiving, by a browser of a client device, instructions associated with a website provided by a server, wherein the instructions invoke a cryptographic routine;
   generating, by the client device, a key for the website according to the cryptographic routine;
   tagging, by the client device, the key with a marker associating the key with the website to produce a tagged key, wherein the marker identifies the website with which the instructions are associated and comprises a key export privilege;
   storing the tagged key in a memory associated with the browser; and
   exporting cryptographic data to another server providing another website if the key export privilege of the tagged key permits export of the cryptographic data.

2. The method of claim 1, wherein the marker comprises information from a certificate associated with the website.

3. The method of claim 1, further comprising:
   generating cryptographic data based upon the tagged key;
   associating the cryptographic data with the tagged key; and
   storing the cryptographic data in the memory.

4. The method of claim 1, further comprising:
   receiving a cryptographic operation request from the another website provided by the another server to generate the cryptographic data based upon the tagged key; and
   generating the cryptographic data based upon the tagged key if the marker of the tagged key is associated with the another website.

5. The method of claim 1, further comprising:
   performing a cryptographic data routine to generate the cryptographic data based upon the tagged key, wherein the cryptographic data routine comprises one of: a digital signature generation routine, a data encryption routine, a data decryption routine and a digital signature verification routine;
   associating the cryptographic data with the tagged key; and
   storing the cryptographic data in the memory.

6. A method comprising:
   accessing, by a browser of a client device, a website provided by a server to obtain a script;
   interpreting, by the browser, the script associated with the website during the accessing, wherein the script comprises a cryptographic operation;
   generating, by the client device, a key for the website in response to the interpreting the script comprising the cryptographic operation during the access to the website;
   tagging, by the client device, the key with a marker associating the key with the website to produce a tagged key, wherein the marker identifies the website with which the script is associated and comprises a key export privilege;
   storing the tagged key in a memory associated with the browser; and
   exporting cryptographic data to another server providing another website if the key export privilege of the tagged key permits export of the cryptographic data.

7. The method of claim 6, wherein the marker comprises information from a certificate associated with the website.

8. The method of claim 6, wherein the key export privilege defines conditions for permitting export of the cryptographic data generated based upon the tagged key.

9. The method of claim 6, further comprising:
   generating the cryptographic data based upon the tagged key;
   tagging the cryptographic data with the marker; and
   storing the cryptographic data in the memory.

10. The method of claim 6, further comprising:
    generating the cryptographic data based upon the tagged key;
    tagging the cryptographic data with the marker; and
    transmitting the cryptographic data to the server providing the website.

11. The method of claim 6, further comprising:
    generating the cryptographic data based upon the tagged key; and
    transmitting the cryptographic data to the server providing the website.

12. The method of claim 6, further comprising:
    receiving a cryptographic operation request from the another website provided by the another server to generate the cryptographic data based upon the tagged key; and
    generating the cryptographic data based upon the tagged key if the marker of the tagged key is associated with identification data of the another website.

13. The method of claim 6, further comprising:
    generating the cryptographic data based upon the tagged key; and
    transmitting the cryptographic data to the another server providing the another website if the marker of the tagged key from which the cryptographic data was generated is associated with the another website.

14. The method of claim 6, further comprising:

performing one of digital signature generation, data encryption, data decryption and digital signature verification based upon the tagged key to generate the cryptographic data; and storing the cryptographic data in the memory.

15. A client device comprising:

a browser;

an interface for connecting with a server; and a processor coupled to the interface, the processor configured to:

- access a script on a website provided by the server, wherein the script comprises a cryptographic operation;
- interpret the script, including the cryptographic operation;
- generate a key for the website containing the script according to the cryptographic operation while interpreting the script;
- tag the key with a marker associating the key with the website to produce a tagged key, wherein the marker identifies the website with which the script is associated and comprises a key export privilege;
- store the tagged key in a memory associated with the browser; and
- export cryptographic data to the server providing the website if the key export privilege of the tagged key permits export of the cryptographic data.

16. The client device of claim 15, wherein the processor is further configured to:

generate the cryptographic data based upon the tagged key; and export the cryptographic data to the server if the marker of the tagged key is associated with the website provided by the server.

17. The client device of claim 15, wherein the processor is further configured to:

generate the cryptographic data based upon the tagged key in response to another script of another website provided by another server if the marker of the tagged key is associated with the another website; and export the cryptographic data to the another server.

18. The client device of claim 15, wherein the marker for tagging the key comprises identification data of the website of the interpreted script to define the server providing the website as an entity to which data generated based upon the tagged key can be exported.

19. The client device of claim 15, wherein the marker for tagging the key comprises information from a certificate associated with the website of the interpreted script, wherein the information from the certificate comprises identification data of one or more trusted entities, wherein data generated based upon the tagged key can be exported to the one or more trusted entities.

20. The client device of claim 15, wherein the marker for tagging the key comprises a domain, and wherein websites associated with the domain are defined as entities to which data generated based upon the tagged key can be exported.

21. The client device of claim 15, wherein the processor is further configured to perform one of data encryption, data decryption, digital signature generation and digital signature verification to generate cryptographic data based upon the tagged key.

22. The client device of claim 15, wherein the marker further comprises a tag variable identifying one or more websites and an export_mode variable defining conditions for permitting export of data generated based upon the tagged key.

23. A non-transitory computer readable storage medium storing instructions which, when executed, cause a processor to perform a method comprising:

- generating a key in response to an interpreted first script associated with a first website, wherein the key is assigned to the first website;
- tagging the key with a marker associating the key with the first website to produce a tagged key, wherein the marker identifies the website with which the script is associated and comprises a key export privilege;
- storing the tagged key in a memory associated with a browser on the client device;
- generating cryptographic data based upon the tagged key in response to an interpreted second script associated with a second website if the second website is associated with the marker of the tagged key; and
- exporting the cryptographic data to a second server providing the second website if the tagged key is associated with the second website and if the key export privilege permits export of the cryptographic data to the second server.

* * * * *